United States Patent
Antony et al.

(10) Patent No.: US 12,047,475 B2
(45) Date of Patent: Jul. 23, 2024

(54) PARALLEL NETWORK ARCHITECTURE FOR AGGREGATE DATA ROUTING

(71) Applicant: Audacious Inquiry, Catonsville, MD (US)

(72) Inventors: Sandeep Antony, Columbia, MD (US); Scott Afzal, Washington, DC (US); David Horrocks, Baltimore, MD (US)

(73) Assignee: Audacious Inquiry LLC, Catonsville, MD (US)

( * ) Notice: Subject to any disclaimer, the term of this patent is extended or adjusted under 35 U.S.C. 154(b) by 143 days.

(21) Appl. No.: 17/190,358

(22) Filed: Mar. 2, 2021

(65) Prior Publication Data

US 2021/0194997 A1    Jun. 24, 2021

Related U.S. Application Data

(63) Continuation of application No. 15/911,137, filed on Mar. 4, 2018, now Pat. No. 10,938,962, which is a continuation of application No. 15/808,887, filed on Nov. 9, 2017, now abandoned, which is a continuation-in-part of application No. 15/010,142, filed on Jan. 29, 2016, now abandoned, and a continuation-in-part of application No. 14/872,445, filed on Oct. 1, 2015, now Pat. No. 11,114,194, and a continuation-in-part of application No. 14/445,562, filed on Jul. 29, 2014, now abandoned, and a
(Continued)

(51) Int. Cl.
*H04L 69/06* (2022.01)
*G06F 3/04842* (2022.01)
*G06F 16/2455* (2019.01)
*H04L 5/02* (2006.01)
*H04L 69/18* (2022.01)

(52) U.S. Cl.
CPC .......... *H04L 69/06* (2013.01); *G06F 3/04842* (2013.01); *G06F 16/24568* (2019.01); *H04L 5/02* (2013.01); *H04L 69/18* (2013.01)

(58) Field of Classification Search
CPC . H04L 69/06; H04L 5/02; H04L 69/18; G06F 16/24568; G06F 3/04842
See application file for complete search history.

(56) References Cited

U.S. PATENT DOCUMENTS 9,058,635 B1 * 6/2015 Rybkin ................. G16H 10/60
2003/0233252 A1 * 12/2003 Haskell ................. G16H 10/60
  705/2

(Continued)

*Primary Examiner* — William G Trost, IV
*Assistant Examiner* — Adam A Cooney
(74) *Attorney, Agent, or Firm* — Alley IP (57) ABSTRACT

Network architectures are interfaced with diverse inputs like a hub with multiple spokes. A portion of these input are further interfaced as limited outputs. The inputs can be from wholly different users streaming unrelated data in different protocols. HL7 ADTs in these inputs can control network configuration, culling or screening output to communications that match user parameters. Network architectures can aggregate and enhance information that matches from among these inputs, including information across protocols such as HL7. Such information can be provided and stored back to other sources so as to add to or correct wide area data stores. All communications can be provided in real-time and with manageable volumes that do not fatigue users and better manage network resources.

22 Claims, 10 Drawing Sheets

Related U.S. Application Data continuation-in-part of application No. 14/189,225, filed on Feb. 25, 2014, now abandoned, and a continuation-in-part of application No. 14/142,625, filed on Dec. 27, 2013, now abandoned, which is a continuation of application No. 13/844,332, filed on Mar. 15, 2013, now abandoned.

(56) References Cited

U.S. PATENT DOCUMENTS

| | | | |
|---|---|---|---|
| 2004/0059744 A1* | 3/2004 | Duncan | G16H 10/40 707/999.102 |
| 2004/0167804 A1* | 8/2004 | Simpson | A61B 5/0002 705/3 |
| 2006/0122865 A1* | 6/2006 | Preiss | G16H 40/20 705/2 |
| 2007/0273517 A1* | 11/2007 | Govind | G16H 10/60 340/572.1 |
| 2007/0299688 A1* | 12/2007 | Braz | G16H 30/40 705/2 |
| 2008/0021709 A1* | 1/2008 | Greer | G16H 40/20 704/258 |
| 2009/0024416 A1* | 1/2009 | McLaughlin | G16H 10/65 705/3 |
| 2010/0223073 A1* | 9/2010 | Nearman | G16H 80/00 705/3 |
| 2010/0256994 A1* | 10/2010 | Eisenberger | G16H 40/63 705/3 |
| 2013/0006666 A1* | 1/2013 | Schneider | G16H 10/60 705/3 |
| 2013/0197940 A1* | 8/2013 | Garber | G16H 10/60 705/3 |
| 2013/0325505 A1* | 12/2013 | Vengco | G16H 50/70 705/3 |
| 2013/0339052 A1* | 12/2013 | Neff | G16H 10/60 705/3 |
| 2014/0033051 A1* | 1/2014 | Nihal | G06F 3/0484 715/733 |
| 2014/0122734 A1* | 5/2014 | Higgins | H04L 67/2838 709/231 |

* cited by examiner

Profile Full View (2 of 3)

New Search > Modify Search
Patient Care Profile
Patient Name: John X.Smith  Gender: Male  Date of Birth: 04/09/1984

Diagnosis

| | | | Diagnosis | Date Recorded |
|---|---|---|---|---|
| 6/17/2010 | 5 | 0 | ADEWALE, BENJAMIN | |
| 6/17/2010 | 5 | 0 | ADEWALE, BENJAMIN | Unspecified schizophrenia | 2/9/2009 |
| 6/17/2010 | 5 | 0 | ADEWALE, BENJAMIN | Unspecified schizophrenia | 3/9/2009 |
| 6/17/2010 | 5 | 0 | ADEWALE, BENJAMIN | Lamotrigine 100 mg/1 | Unspecified schizophrenia | 3/26/2009 |
| 6/17/2010 | 62 | 30 | ADEWALE, BENJAMIN | Unspecified schizophrenia | 11/1/2010 |
| 6/17/2010 | 20 | 30 | ADEWALE, BENJAMIN | oxycodone hydrochloride 5 mg/1 | Unspecified schizophrenia | 7/20/2010 |
| 12/24/2010 | 20 | 30 | KEISLING, ROBERT | Unspecified schizophrenia | 7/23/2010 |
| 12/24/2010 | 30 | 0 | KEISLING, ROBERT | benztropine mesylate 2 | Late effects of cerebrovascular disease, hemiplegia affecting dominant side | 1/16/2012 |
| 12/24/2010 | 60 | 0 | KEISLING, ROBERT | Quetiapine fumarate 300 mg/1 | Late effects of cerebrovascular disease, hemiplegia affecting dominant side | 9/24/2012 |
| 11/9/2010 | 60 | 30 | KEISLING, ROBERT | Quetiapine fumarate 300 mg/1 | Late effects of cerebrovascular disease, hemiplegia affecting dominant side | 2/25/2013 |
| 11/9/2010 | 60 | 30 | KEISLING, ROBERT | Lamotrigine 100 mg/1 | Late effects of cerebrovascular disease, hemiplegia affecting dominant side | 2/25/2013 |
| 10/11/2010 | 60 | 30 | KEISLING, ROBERT | Lamotrigine 100 mg/1 | Late effects of cerebrovascular disease, hemiplegia affecting dominant side | 3/11/2013 |
| 10/21/2010 | 60 | 30 | KEISLING, ROBERT | Lamotrigine 100 mg/1 | Late effects of cerebrovascular disease, hemiplegia affecting dominant side | 4/8/2013 |
| 1/31/2011 | 60 | 30 | KEISLING, ROBERT | Lamotrigine 100 mg/1 | Depressive disorder, not elsewhere classified | 4/9/2020 |

— 1736
— 1735

Procedures

| Service From Date | Service To Date | Place of Service | Description |
|---|---|---|---|
| 8/26/2010 | 8/26/2010 | DC FIRE DEPT AMBULANCE SVC | Ambulance service, basic life support, emergency transport (bls-emergency) |
| 8/26/2010 | 8/26/2010 | DC FIRE DEPT AMBULANCE SVC | Ground mileage, per statute mile |
| 7/16/2012 | 7/20/2012 | NURSING UNLIMITED SERVICES, INC. | Services of home health/hospice aide in home health or hospice settings, each 15 minutes |
| 7/16/2012 | 7/20/2012 | NURSING UNLIMITED SERVICES, INC. | Services of home health/hospice aide in home health or hospice settings, each 15 minutes |
| 7/16/2012 | 7/20/2012 | NURSING UNLIMITED SERVICES, INC. | Services of home health/hospice aide in home health or hospice settings, each 15 minutes |
| 7/16/2012 | 7/20/2012 | NURSING UNLIMITED SERVICES, INC. | Services of home health/hospice aide in home health or hospice settings, each 15 minutes |
| 7/16/2012 | 7/20/2012 | NURSING UNLIMITED SERVICES, INC. | Services of home health/hospice aide in home health or hospice settings, each 15 minutes |
| 7/16/2012 | 7/20/2012 | NURSING UNLIMITED SERVICES, INC. | Personal care services, per 15 minutes, not for an inpatient or resident of a hospital, nursing facility, ICF/mr or imd, part of the individualized plan of treatment (code may not be used to identify services provided by home health aide or certified nurse assistant) |

— 1737

1700
1701

Health Relationships

CAliPHR Tab

1700

*Measure Detail Screen*

CMS122v4
Diabetes: Hemoglobin A1c Poor Control

| Sub-measure Title | |
|---|---|
| Description | Percentage of patients 18-75 years of age with diabetes who had hemoglobin A1c > 9.0% during the measurement period. Read less |
| Guidance | Patient is numerator-compliant if most recent HbA1c result is missing, or if there are no HbA1c tests performed and results documented during the measurement period. Only patients with a diagnosis of Type 1 or Type 2 diabetes should be included in the denominator of this measure; patients with a diagnosis of secondary diabetes due to another condition should not be included. Read more |
| Stratification | None |

Initial Population ❹  Numerator ❷  Denominator ❹  Care Gaps ❶

Denominator Criteria:
Equals Initial Population

| Last Name | First Name | Gender | DOB |
|---|---|---|---|
| N Adult DM | 2 | M | Sep 04, 1959 |
| N Heart | 5 | M | Jan 11, 1952 |
| A | Diabetes_Adult | F | Feb 01, 1985 |
| B | Diabetes_Adult | F | Feb 01, 1985 |

Results: 1 - 4 / 4          Limit: 10     <   1   >   1753

PARALLEL NETWORK ARCHITECTURE FOR AGGREGATE DATA ROUTING

RELATED APPLICATIONS

This application is a continuation of, and claims priority under 35 U.S.C. § 120 to, application Ser. No. 15/911,137 filed Mar. 4, 2018, now U.S. Pat. No. 10,938,962, which is a continuation of application Ser. No. 15/808,887 filed Nov. 9, 2017, which is a continuation-in part of application Ser. No. 15/010,142 filed Jan. 29, 2016, Application Ser. No. 14/872,445 filed Oct. 1, 2015, Application Ser. No. 14/445,562 filed Jul. 29, 2014, Application Ser. No. 14/189,225 filed Feb. 25, 2014, and application Ser. No. 14/142,625 filed Dec. 27, 2013, which is a continuation of application Ser. No. 13/844,332 filed Mar. 15, 2013. These applications are incorporated herein by reference in their entireties.

BACKGROUND

Network hub infrastructure often includes processors and related transient memory and/or cache connected with one or more servers and network-side databases under its control. The servers, or potentially ports or other types of interfaces, at the hub communicatively connect to one or more spoke data sources or streams for the hub. For example, a network hub may connect to third-party hosts, other databases, and/or services that provide signals to the network hub. Each of these spoke data sources may require unique signal management, authentication, and/or communications protocols, for which each server, port, or other hub-side interface must be configured, either with hardware matching and satisfying the protocol and/or software configured to provide hub-side authentication, interaction, and data-management with the sources and streams.

Dynamic third-party spokes provide information or services that may change or be updated over time, potentially in real-time for data to match current physical conditions or occurrences. For example, a spoke relational database may update read-only-memory in real-time with new or updated entries as detected physical characteristics change, updated calculations are completed, and/or new data becomes available. Or, for example, a spoke third-party service may return new signals in response to hub-side server queries. Or, for example, a spoke data stream may transmit information in real-time as generated or received, such as network status, client interactions, processor actions, etc. These dynamic network spokes require the hub processor to concomitantly handle dynamic signal input in multiples equal to spoke number, often requiring hub processing power to exceed that of any spoke service.

On the other side of the network hub, servers, or potentially ports or other types of interfaces, communicatively connect to one or more spoke clients or users. The same types of configuration for protocol, authentication, data management, etc. with regard to spoke clients and users must be implemented at the hub for each spoke client. The hub may act as a simple multiplexor feeding signals from each spoke data source to each spoke client in composite or multiplexed fashion. Similarly, information may be aggregated in a hub-side database and analyzed for retrieval by spoke clients, potentially through operator or processor query from client members in the network. In the instance of data streams, the network architecture may provide continuous signals to clients in visual or formatted fashion so that operators at client spokes may more easily display, such as through light signals emanating from a substrate surface forming a GUI, and consume all data incoming from potentially several spoke data streams.

Figure 1:
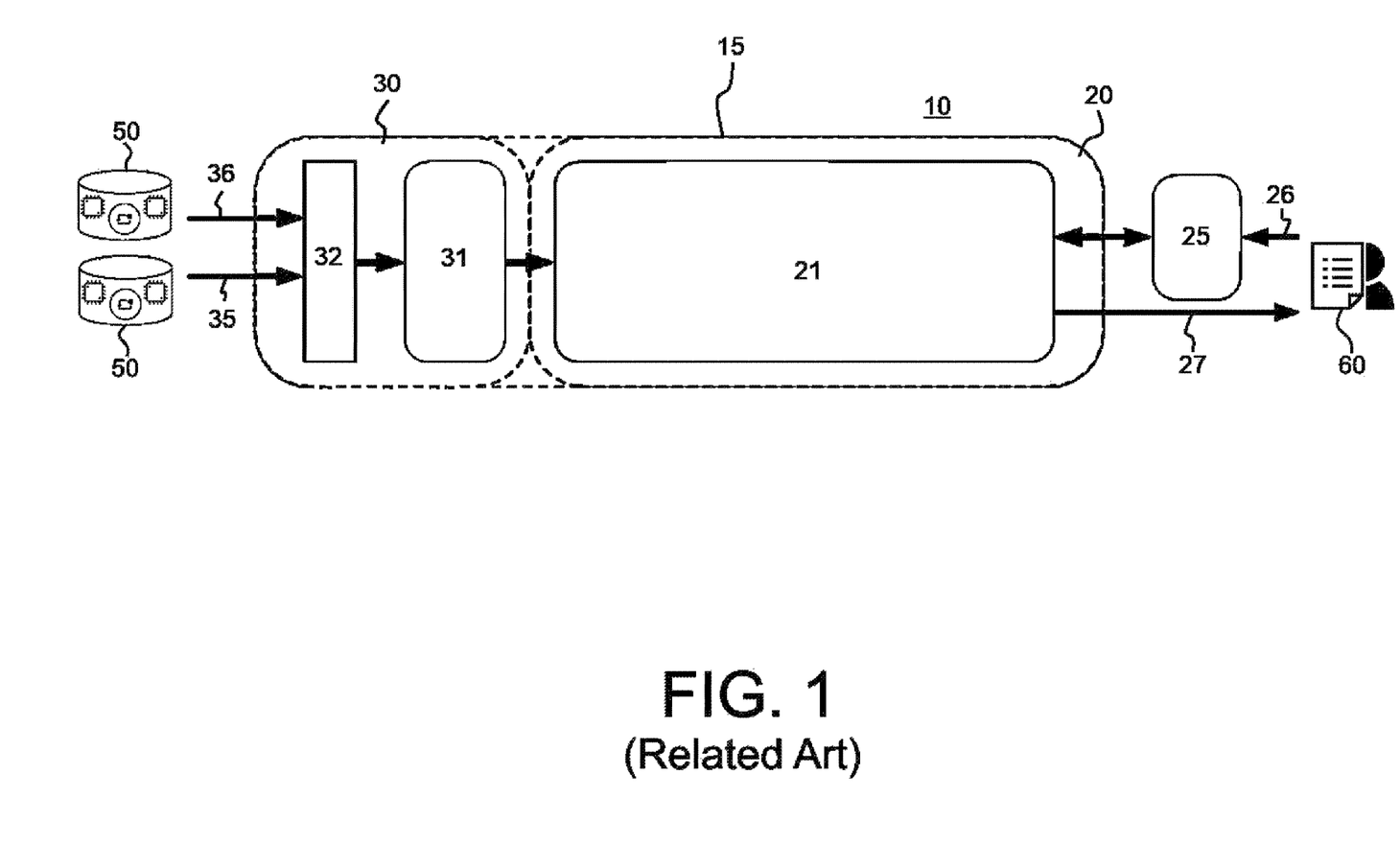
FIG. 1 is an illustration of a related art network architecture.

Examples of related art network architectures handling data streams in real-time and/or from multiple spoke-side sources having heterogenous configurations can be found in U.S. Pat. No. 9,800,608 to Korunsky et al.; U.S. Pat. No. 9,437,022 to Vander Broek; U.S. Pat. No. 9,348,876 to Paranjpe et al.; and U.S. Pat. No. 9,083,770 to Drose et al. FIG. 1 is an illustration of another related art hub-and-spoke network architecture that aggregates data across a large population, with several distinct users, in an exchange or similar database, such as Maryland's CRISP network and associated MPI, disclosed in the Jun. 12, 2009 publication "CRISP" by the state of Maryland and incorporated herein by reference in its entirety.

As shown in FIG. 1, related art network 10 includes an exchange 15 having a matching structure 30, database 21, and an information logic structure 20. Matching structure 30 may be a digitized or computer-based system that facilitates entry, gathering, and organization of information from one or more data sources 50 providing a variety of information to exchange 15. For example, sources 50 may provide clinical feeds 36 and/or Admit-Discharge-Transfer (ADT) messages 35 to matching structure 30. It is understood in related art exchanges, including CRISP, these inputs may operate on several different formats, standards, communication protocols, etc. taking the form of both real-time streams and periodic batch-wise data transfers. For example, clinical feeds 36 may stream patient biographical information, treatment, other medical history, insurance information, provider activities, lab results, etc. that typically reflect healthcare information on a per patient basis, and ADT messages 35 as received by exchanges like CRISP are understood to be a specific type of HL7 message generated and transmitted in real-time with an encounter with data sources 50, indicating an admittance, discharge, transfer, to/from/within a provider. Protocols like Direct and HL7 and the specific ADT formatting are defined by their standard-setting bodies, explained at wiki.directproject.org and hl7.org/implement/standards.

As shown in FIG. 1, matching structure 30 may include an interface or router 32 that receives clinical feeds 36 and/or ADT messages 35 streaming from sources 50. Router 32 may process or otherwise prepare data for entry into a database 21 and associated master patient index (MPI) 31, which matches identifying information with content of database 21 to reconcile identity within health information exchange 15. In large scale hub-and-spoke architectures such as exchanges like CRISP, the serial, one-way information flow from sources 50 to database 21 includes potentially thousands or millions of different entries received and stores on a daily basis. Information from sources 50 is often stored, indexed, or otherwise routed based on the information itself, without any correction, un-corrupting, or enhancement of the data.

The serial arrangement of FIG. 1 allows users 60 on the opposite end of the architecture to access healthcare information stored in database 21 through logic structure 20 in health information exchange 15 that is interfaced with healthcare information routing and demographics matching structure 30. Subscribing participants 60 can login or otherwise access logic structure 20 through a query portal 25. Users 60 can enter queries 26 into portal 25, which is interfaced with logic structure 20. Logic structure 20 may gather and/or associate data from database 21 with MPI 31 based on the parameters of query 26 and any access/information rules applicable to system 10. Alternatively or additionally, subscribing participants 60 may be delivered direct notifications 27 reporting all information received in database 21, responsive to queries or not.

SUMMARY

Example embodiment network architectures receive distinct inputs from multiple parallel sources and, residing between these sources, provide a filtered output back to one of the inputs. The sources may be diverse, with different operators, configurations, roles, and/or data types, requiring example embodiment architectures to have appropriate ports or interfaces programmed for the distinct data streaming in, including HL7 ADTs. The architecture is structured to adapt operation and provide limited output back to a subset of the sources using output conditions from that subset. A computer within the architecture pushes the curated flow of HL7 ADT and related content when it satisfies the conditions, in real-time with data receipt, so as to provide much less than the entire volume of incoming data from all sources. This conserves communications bandwidth, processor power consumption, and endpoint memory consumption, as well as reducing user fatigue or overwhelm.

Example architectures, being connected among, and configured with protocols to interact with, disparate user and provider sources, can combine and improve flows from multiple sources, including information across protocols such as HL7. For example, a processor configured for interoperability with an exchange can write information from output conditions back to the exchange that provides or receives streams. This information can be additional or corrected, improving database operation and contents that may itself be streamed back to example architectures with the additional information and better fit.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

FIG. 7 is an illustration of a third page of the multiple-field screen of the example embodiment GUI.

FIG. 9 is an illustration of a selected pane screen of the example embodiment GUI.

DETAILED DESCRIPTION

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the terms first, second, etc. may be used herein to describe various elements, these elements should not be limited to any order by these terms. These terms are used only to distinguish one element from another; where there are "second" or higher ordinals, there merely must be that many number of elements, without necessarily any structural or functional difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The inventors have recognized that related art networks, such as CRISP and contemporaneous exchanges, receive thousands, if not millions, of individual pieces of information daily, streamed and dispatched from many different sources operating on many different protocols. The one-way, serial flow of this data into the exchange requires users to either query the exchange at set intervals not in real-time and/or be deluged in real-time with the huge volume of raw data received. This problem is unique to hub, processor-based networks that can receive, store, and search so much data from so many sources and individual transactions. Post hoc queries or a real-time feed thus do not accurately and consistently provide users with timely and well-fitted data about encounters.

The inventors have further recognized that the data itself streaming from the sources, such as individual ADT fields within ADT messages 35, may be lower-quality and may not be useful alone to direct information and/or accurately associate with related information. ADT messages often contain errors because they are recorded by hand and rely on the information relayed at registration, sometimes under duress at an emergency encounter. Further, all relevant and correct information may not be given. Streaming all information, or even all ADT messages, directly to users identified therein results in overwhelming volume and irrelevancy of information provided. Even a query system based on one-way related art networks may return exceedingly large and poor-quality search results based on such data. This may cause recipients to become fatigued by constant and/or low-value information and alerts, resulting in less useful information consumed from related art systems.

The inventors have further recognized that spoke, or parallel, data sources possessed by distinct networks and entities can provide more accurate information for network operations, including better directing information and improving its content. Related art systems operating as a one-way, serial repository from data sources cannot use diverse sources and providers to so enhance information delivery. Moreover, related art systems may not be sufficiently configured to connect and receive information from several different types of sources, including users, clinical feeds, ADT messages, HIE interfaces, and/or any other stream or database. Such data sources are often operated and controlled by disparate organizations and entities operating under different communications protocols having distinct information interfaces. As such, no single network is able to aggregate and combine all information from the various streams, which may be dynamic and change in real-time, into a single output that interrelates all relevant data for an operator query or parameter. Thus, there is a need for a network architecture that can interface with multiple data sources having distinct protocols, formatting, or standards and offering unique but related data through a single output interface. To overcome these newly-recognized problems as well as others, the inventors have developed example embodiments and methods described below to address these and other problems recognized by the Inventors with unique solutions enabled by example embodiments.

The present invention is network architectures interfaced with multiple, disparate data streams to aggregate the same for improved endpoint delivery and quality. In contrast to the present invention, the few example embodiments and example methods discussed below illustrate just a subset of the variety of different configurations that can be used as and/or in connection with the present invention.

Figure 2:
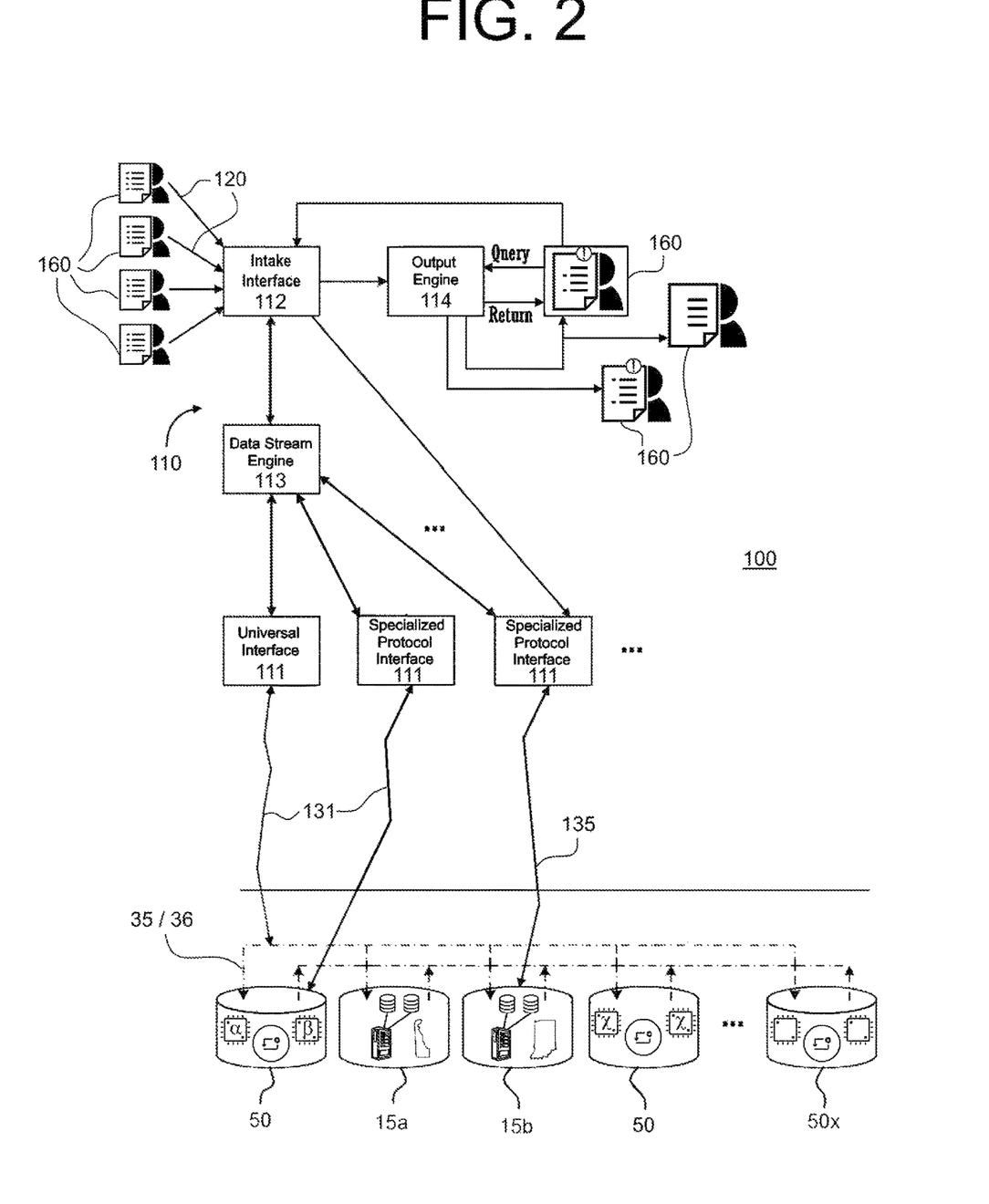
FIG. 2 is an illustration of an example embodiment network architecture.

FIG. 2 is a diagram of an example embodiment network architecture 100 that can be configured through proper hardware infrastructure and software programming to execute example methods. As shown in FIG. 2, cluster 110 may be connected to a health information exchange 15. Cluster 110 and health information exchange may be co-located or remote, and may be connected via a dedicated connection or bus in a same setting or over great distances through networks such as VPNs, WANs, LANs, or the Internet.

Although example embodiment architecture 100 includes a related art health information exchange 15, it is understood that other types of sources for healthcare information are useable with example embodiments and methods. For example, a health system or other database may be used in place of health information exchange 15. Still further, health information exchange 15 could be fully contained within cluster 110 to provide a centralized system for receiving, storing, processing, and/or delivering desired healthcare information to various subscribing providers 160.

As shown in FIG. 2, cluster 110 is configured to receive subscriber parameters 120 from subscribing providers 160. Example embodiment network 100 is useable with a wide variety of subscribing providers 160, including primary care physicians, specialists, insurance providers, hospitals, labs, etc. who may need or be able to better use specific types of healthcare information, in specific formats, in specific circumstances.

Subscriber parameters 120 define the services to be provided by example embodiment system 100. For example, subscriber parameters 120 may include a roster of patient information (hospital identifier, member ID, any names, home address, city, state, zip code, date of birth, gender, ssn, phone numbers, membership status, etc. or portions thereof) identifying patients under the care or covered by subscribing providers 160.

Subscriber parameters 120 may include a limiting set of events or circumstances for which subscribing providers 160 desire healthcare information. For example, a subscribing provider 160 who is a specialist may want only healthcare information relating to patients under the care of the specialist who have an encounter for a condition within the specialist's field of practice; or a subscribing provider 160 who is a large general practice of physicians may want cumulative healthcare information provided only once a month for a particular subset of very active patients; or an insurance provider as a subscribing provider 160 may want to be notified only when a certain type of encounter that reflects a need for patient contact or intervention occurs, such as multiple ER visits for a condition that may be successfully treated in an outpatient setting. All these limiting filters may be present in subscriber parameters 120. As such, subscriber parameters 120 may set out a roster of responsive client identification and/or a variety of circumstances for which subscribing providers 160 desire healthcare information, including any combination of event or message types based on which to create notifications, frequency of notifications, delivery format and type preferences, etc.

Each subscribing provider 160 may provide subscriber parameters 120 to cluster 110. Subscribing providers 160 may provide multiple subscriber parameters 120 or modify existing subscriber parameters 120 as well, as their patients and needs and desires for healthcare information delivery change. Alternatively, subscriber parameters 120 may be automatically generated based on rules of example embodiment system 100 for policy compliance or service reasons. For example, a default set of subscriber parameters 120 may be provided for subscribing providers 160 who provide incomplete or incorrect parameters. Or, for example, if a subscribing provider 160 is a hospital, subscriber parameters 120 may be automatically generated for the hospital to include all patients discharged within the past 60 days, either as a desired service or to comply with regulation.

Subscriber parameters 120 may be input and/or updated into cluster 110 through a subscriber login interface, manually from subscriber parameters 120 that are delivered, such as from a spreadsheet via email, and/or automatically generated therein based on a ruleset. Cluster 110 may include an input structure 112 to specifically receive, process, and update/store information from subscriber parameters 120 as they are input. Input structure 112 may be, for example, a module or subroutine within cluster 110 or may be a dedicated server with independent processing capability, depending on the configuration of cluster 110.

Based on information provided in subscriber parameters 120, cluster 110 can collect, compile, and provide very specific and well-tailored healthcare information to subscribing providers. As shown in FIG. 2, cluster 110 includes a logic core 113 interfaced with and/or controlling operation of input structure 112, healthcare information source interface 111, and notification engine 114 in cluster 110. Logic core 113 may coordinate operations, including healthcare message processing and/or delivering and enhancement of MPI 31 (FIG. 1) through interface connection 131.

Healthcare information source interface 111 may be specifically programmed based on the configuration of known MPI 31 (FIG. 1) with which it will interface via interface connection 131, or any other health care information source instead of exchange 15. Healthcare information source interface 111 may recognize and understand how to read specific data structures or information association regimes present within MPI 31, such as client IDs, patient-identifying information, relationships among entries and records, etc., stored in MPI 31. As seen in FIG. 2, example embodiment system 100 may require only directed front-end interfaces with an external or third-party health information exchange 15, reducing complexity and/or potential for connection error problems that might exist were all other portions of exchange 15 having their own connection to cluster 110 or if a subscriber had to directly deal with and query exchange 15. Logic core 113 and/or interface 111 may be a central routine, specifically-configured processor, and or wholly individual server with storage and processor within cluster 110, for example, depending on the configuration of cluster 110.

For enhancement of MPI 31, logic core 113 may provide MPI 31 with client-identifying entries from subscriber parameters 120. The client-identifying entries may be stored in MPI 31 to associate correct patient information with incoming data. For example, an existing MPI 31 may include data of a patient's name and address indexed to some patient data in a database, with data of the patient's social security number, date of birth, and gender indexed to other patient data. Logic Core 113 may provide all correct and comprehensive patient information to MPI 31 via interface 111 and interface connection 131 so that full patient-identifying information may be correctly matched with existing indices stored in MPI 31 and correctly associated with patient data. Further, when exchange 15 provides ADT messages 35 to system 110 or otherwise, such ADT messages 35 may be properly enhanced and associated with all submitted client information going forward.

For healthcare message processing, all incoming notifications to health information exchange 15 may be monitored and/or received by cluster 110 through interface connection 131, where interface 111 is connected to exchange 15. Incoming messages may include standard or enhanced ADT messages 35. Logic core 113 may compare the contents of ADT messages 35 against client-identifying information from a roster processed by input structure 112 from client parameters 120 to identify every message relating to a responsive client, e.g., one specifically-identified in a roster from a subscriber. In this way, logic core 113 may observe and act on every message about a patient that is responsive to a provider's roster, regardless of partial or some incorrect information being present in ADT message 35 or initially stored in MPI 31, and may properly match messages 35 with correct subscribing providers 160.

Logic core 113 may further process all messages 35 provided from exchange 15 to discard those messages or portions of messages containing duplicate, incorrect, or low-value contents. For example, a provider may generate an ADT message 35 for an internal transfer that has no meaning outside the provider facilities, or a message 35 may include typographical information of a patient's information or an impossible/redundant administrative status change, such as duplicative admittances for the same patient and facility. Logic core 113 may analyze messages for such errors, by comparing them against known correct client information, a saved history of received messages, and/or internal rulesets for impossible/plainly incorrect encounters, and identify incorrect or useless messages or portions of the same for disposal without passing them on to subscribing providers 160.

Logic core 113 may also process incoming messages 35 against subscriber parameters 120 in order to determine if messages 35 are responsive to subscriber needs and/or properly format and time any notifications generated based on the same. For example, subscribing providers 160 may provide notification limitations within parameters 120 to input structure 112 from subscriber parameters 120, such as an exclusion for particular types of encounters and/or patients. Logic core 113 may further compare such notification limitations against each ADT message 35 to exclude non-responsive messages and forwarded those complying with subscriber's notification limitations to notification engine 114 to make the ADT message available to the subscriber in accordance with any other client parameters such as delivery format or frequency.

Logic core 113 may further control notification engine 114 to generate healthcare notifications only at appropriate instances based upon subscriber parameters 120. For example, whenever logic core 113 monitors an ADT message 35 generated based on a client encounter for a client included in a roster in subscriber parameters 120, a healthcare notification may be generated for the subscribing provider 160. Alternatively, if subscriber parameters 120 requested notifications only at weekly intervals, a notification of the encounter observed in the ADT message 35 may be held until the requested interval has passed. Notification engine 114 may be a module or subroutine within cluster 110 or may be a dedicated server with independent processing capability, for example, depending on the configuration of cluster 110.

Healthcare notifications generated by notification engine 114 may include a wide variety of detail based on subscriber parameters and available healthcare information. For example, healthcare notifications may include only the ADT message content that triggered the notification, or healthcare notifications may include any or all healthcare information identified in MPI 31 for a patient whenever a responsive notification is generated for that patient. Subscriber parameters 120 may indicate a level and type of information requested in healthcare notifications; for example, a subscribing provider 160 may list internal identifiers, name of a primary care provider, record number, and/or any other contextual information to aid their bookkeeping that can be added into notifications by engine 114. Still alternatively, logic core 113 may select particularly high-value or relevant healthcare data for inclusion in a notification. For example, an insurance provider can submit subscriber parameters 120 requesting notifications for treatment or prescription changes, and example embodiment system 100 may provide a notification to the provider each time an ADT message 35 contains an encounter with a changed treatment or prescription; the notification may also contain information about a new condition or hospital encounter that resulted in change if this information is determined as relevant or important, for, say, determining whether the new prescription is effective or wasteful, by the logic core 113.

Notification engine 114 can prepare healthcare notifications including data present solely in cluster 110, such as data stored in a local database that was filtered from ADT messages 35 and MPI 31 by logic core 113 and healthcare information source interface 111, or with information accessible anywhere in example embodiment system 100. For example, healthcare information source interface 111 may have previously identified several different data entries relating to a particular patient in MPI 31. Notification engine 114 may pull and combine all requested information among the previously-identified information in MPI 31 for presentation in a subscriber notification.

Healthcare notifications may be delivered to subscribing providers 160 through a report 127 sent via email, over a direct or secure network, through the Direct standard, in HL7 format, via Internet services, or even hard copy, based on profile information. Healthcare notifications may be structured as narratives, tables, spreadsheets, existing encounter formats, etc. For example, a subscribing provider 160 may have requested a daily notification for a list of active patients, and notification engine 114 may compile and email out a report of all encounters in HL7 format for the identified patients within a daily interval. Alternatively, healthcare notifications may be prepared and stored with notification engine 114 and provided to subscribing providers 160 only upon their access 128 to cluster 110; a reminder of a new healthcare notification may still be provided in this instance. Still further, a subscribing provider 160 may receive notifications via the Direct standard in real-time, permitting providers to readily follow-up with patients at each encounter, such as admission or discharge.

Given the variety of example functions described above, cluster 110 may be structured in a variety of ways to provide desired functionality. Although logic core 113 is shown as a separate structure or routine connected to other parts within cluster 110, it is understood that logic core 113, and its operations and controls, may be incorporated in relevant part in any of input structure 112, healthcare information source interface 111, and/or notification engine 114. Other divisions of structures and functionalities 111, 112, 113, and 114 among any number of separate modules, processors, servers are useable with example embodiment system 100, including execution on a single machine or among distance exclusive servers and processors.

Further, connections shown in example embodiment 100 can be over the Internet, including standard communications protocols such as TCP/IP, or through a programmed application configured to interact with and exchange data in dedicated network or intranet. Servers within example embodiment system 100 may include, for example, conventional domain and/or security protocols for access and authentication as well as processing capacities to retrieve, deliver, and/or format data for use within example embodiment system 100. Or, for example, all of example embodiment system 100 may be configured in a single machine, with an internal bus providing communication between various elements. Further, cluster 110 may also include its own data storage capabilities to handle and persist user inquiries and/or create a processed database mirroring in part data from separate MPI 31.

Example embodiment system 100 may be connected to several health information sources, such as health information exchanges or databases 15a and 15b compiled by separate states or hospital or insurance networks. As shown in FIG. 2, second exchange 15b may include an intake processor or router 32b to which notification engine 114 may provide ADT messages 135 that were originally received and processed (and enhanced with patient information) from exchange 15a. In this way, example embodiment systems may further share information and well-associated ADT messages through several different exchanges between which patients may move. As also seen in FIG. 2, any number of additional clusters X10 can operate like cluster 110 for these additional exchanges, eventually providing new data from other exchanges 15b or otherwise back into router 32a.

Figure 3:
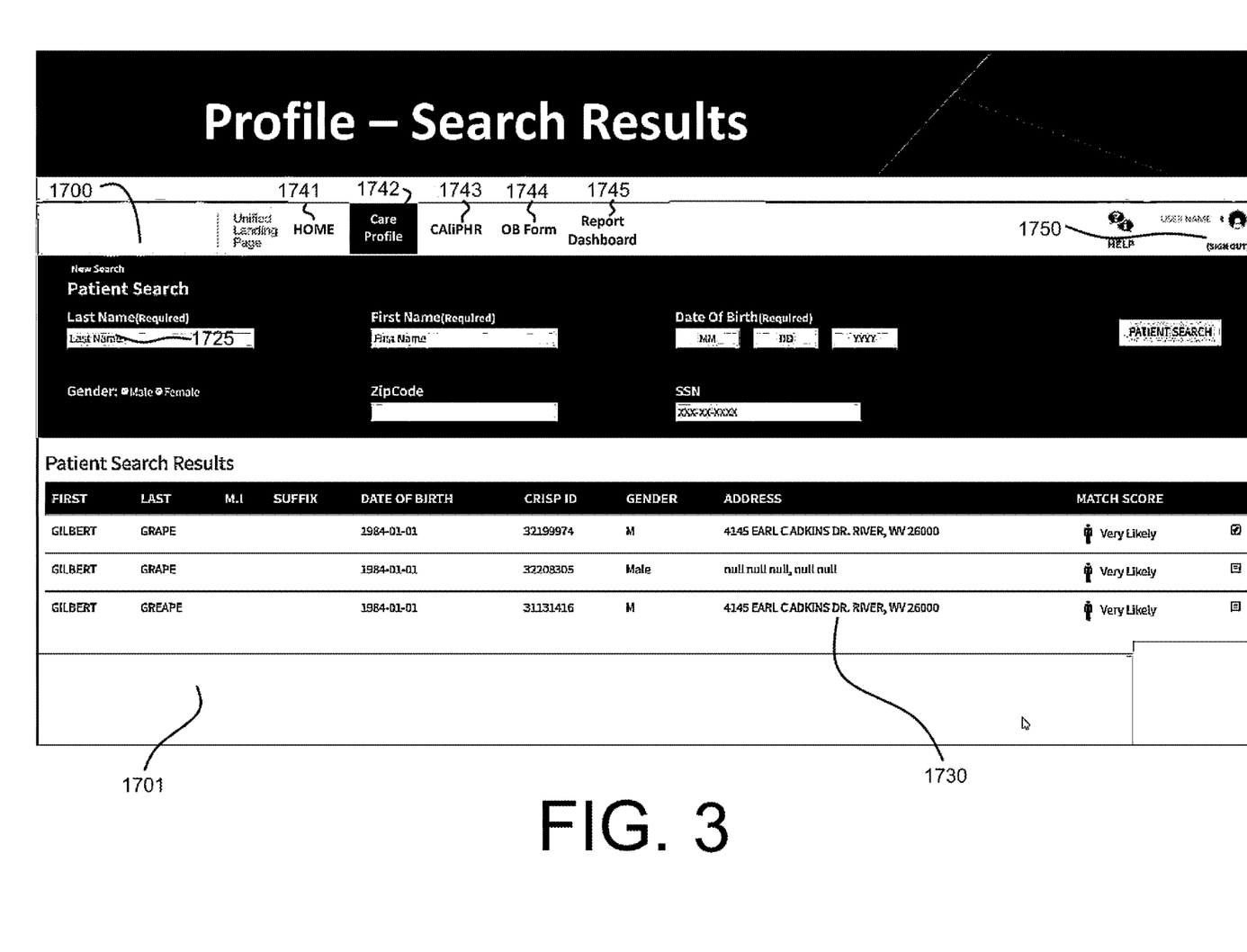
FIG. 3 is an illustration of a profile screen of an example embodiment graphical user interface (GUI).

As shown in FIG. 3, output engine 114 may include graphical instruction or depictions for portions of GUI 1700 as an endpoint. Output engine 114 may include a server or other interface for a third-party operator of GUI 1700 to connect and output relevant signals for endpoint arrangement. GUI 1700 may display graphical output from output engine 114 in specific fields, surfaces, places, and manners as dictated by cluster 110 and engine 114. GUI 1700 may include several specific endpoints itself for particular data, including workspace 1701, input interface 1725, and graphical charts. Workspace 1701 may render specific data directed to different fields in appropriate forms, such as via drop-down menus, pop-up menus, line or a radio button, text input field etc. for input interface 1725, into which an operator may enter a query or control command. Based on the query or in response to a satisfied notification parameter provided by the user, output engine 114 returns a response for display on GUI 1700 in an appropriate surface field, such as a graphic or table for numerical data. In this way, numerical data may be rendered in GUI 1700 as interactive tables, graphical data as, alert or notification data as pop-ups or prompt icons updating the tables and charts, etc. Each of these displays may be in separate fields based on their data stream origin and information type, as determined and controlled by data cluster 110 and output engine 114.

FIG. 3 is an illustration of an example embodiment GUI 1700 showing one screen or collection of fields as different endpoints with origin-specific contents. As seen in FIG. 2, several navigation sections 1741, 1742, 1743, 1744, and 1745 may be displayed on a single surface, allowing an operator to select, click, enter, or otherwise navigate to different sections as operator input. FIG. 2 shows example embodiment GUI 1700 with "Care Profile" navigation section 1742 selected with corresponding workspace 1701 graphically displayed on GUI 1700. In workspace 1701, search results field 1730 is shown, responsive to on-screen entry in input interface 1725. Data cluster 110 (FIG. 2) may direct output engine 114 (FIG. 2) to return a list of matching search results from a connected memory or data stream for a particular query, including near matches and matches with related and partial data field entry matches, which is selectively displayed in field 1730 as an endpoint, only based on the nature of the returned values. GUI 1700 may also support authentication or operator login operation and identification through login selection 1750 in order to determine access to particular data streams and contents thereof.

Figure 4:
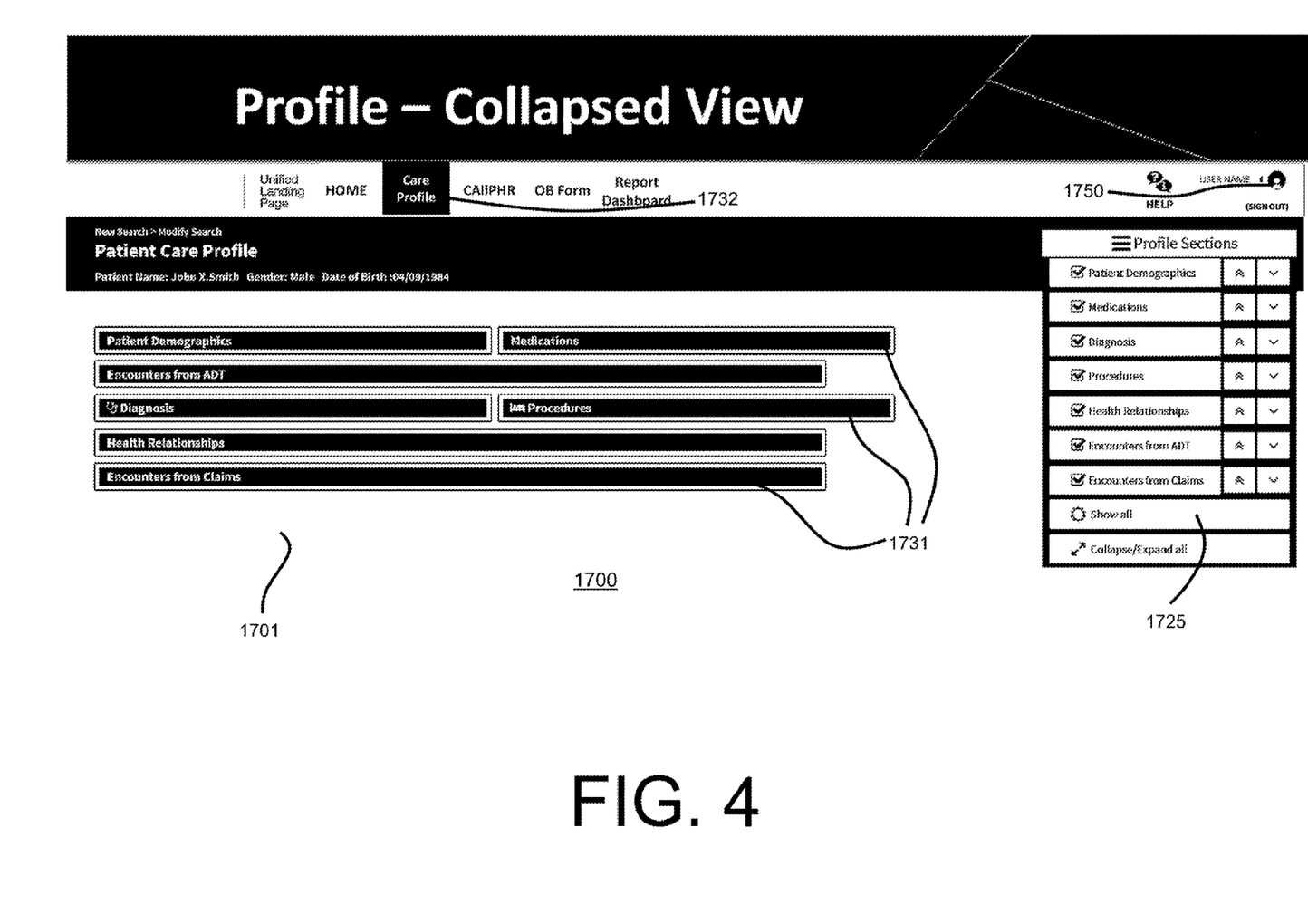
FIG. 4 is an illustration of a selected profile screen of the example embodiment GUI.

FIG. 4 is an illustration of an example embodiment GUI 1700 showing a next screen or collection of fields as different endpoints with origin-specific contents. As seen in FIG. 4, upon selection from field 1730 in FIG. 4, several different expandable profile options 1731 may be displayed for the selection. Another input field 1725 may allow an operator to select which profile options 1731 to display for any particular selection. Each option 1731, if expanded and/or selected, may display a selective field within GUI 1700 as a particular endpoint controlled by cluster 110 and engine 114; that is, cluster 110 may select, format, and display contents in an expanded field under a selected option 1731 as an endpoint from only a single associated data stream. Or, for example, an operator may input a "show all" option and "Expand all" option in input field 1725, displaying GUI 1700 with the screens of FIGS. 4-6.

Figure 5:
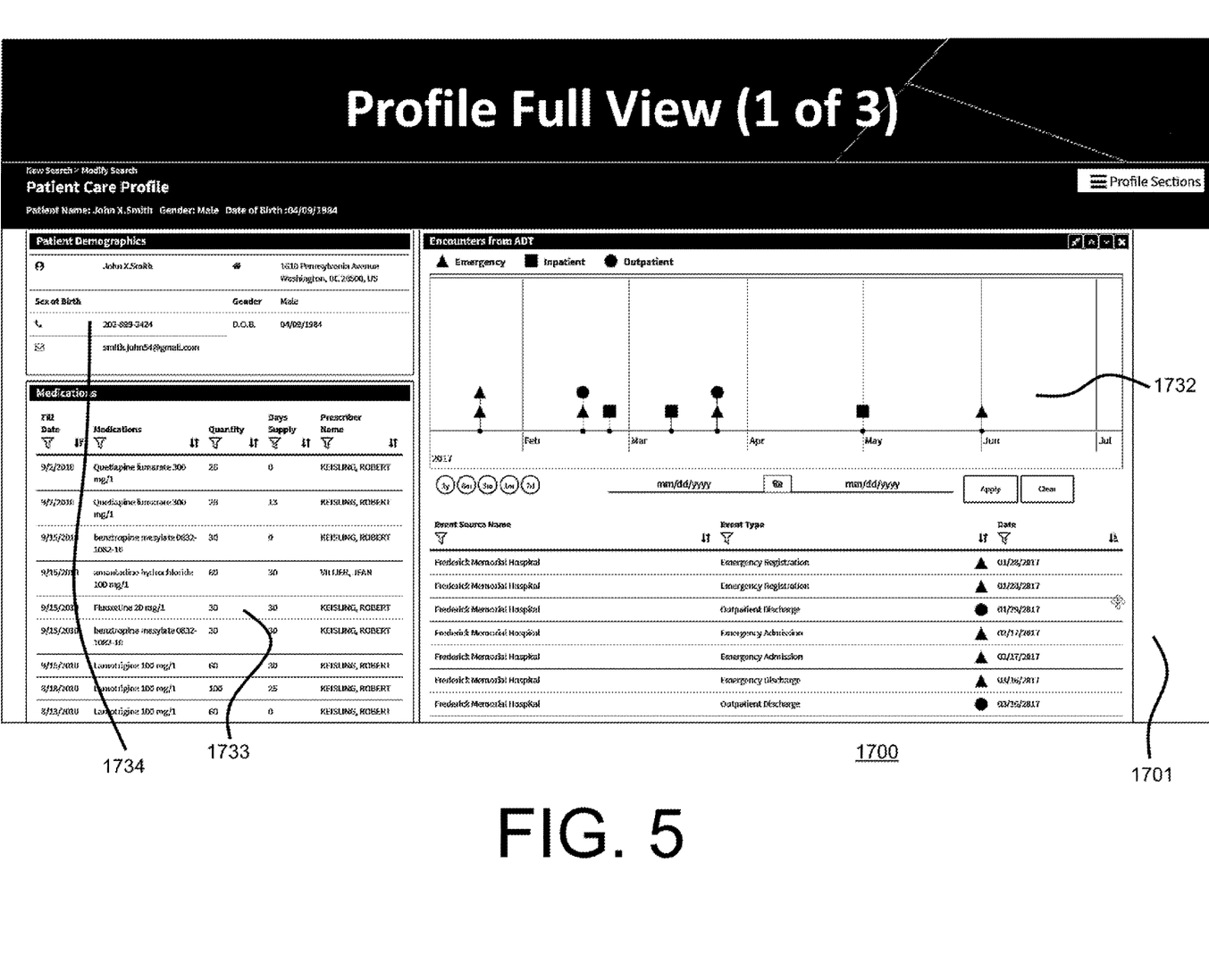
FIG. 5 is an illustration of a multiple-field screen of the example embodiment GUI.

As shown in FIG. 5, example embodiment GUI 1700 may include several different endpoint fields 1734, 1733, and 1732. For example, endpoint field 1732 may graphically display one set of input updated in real-time for a historical period from one source, and endpoint field 1734 may display a static input set from another source operating on potentially different protocols and interfaces. For example, endpoint field 1732 may update with filtered, real-time HL7 signals and messages of a particular type responsive to an operator's parameters for a selected option from FIG. 2, while endpoint field 1734 may display a table retrieved from an HIE, all based on origin as determined from interfaces and engines of FIG. 2. A further endpoint field 1733 may display additional results associated with data displayed in field 1732 from yet another stream or source.

Figure 6:
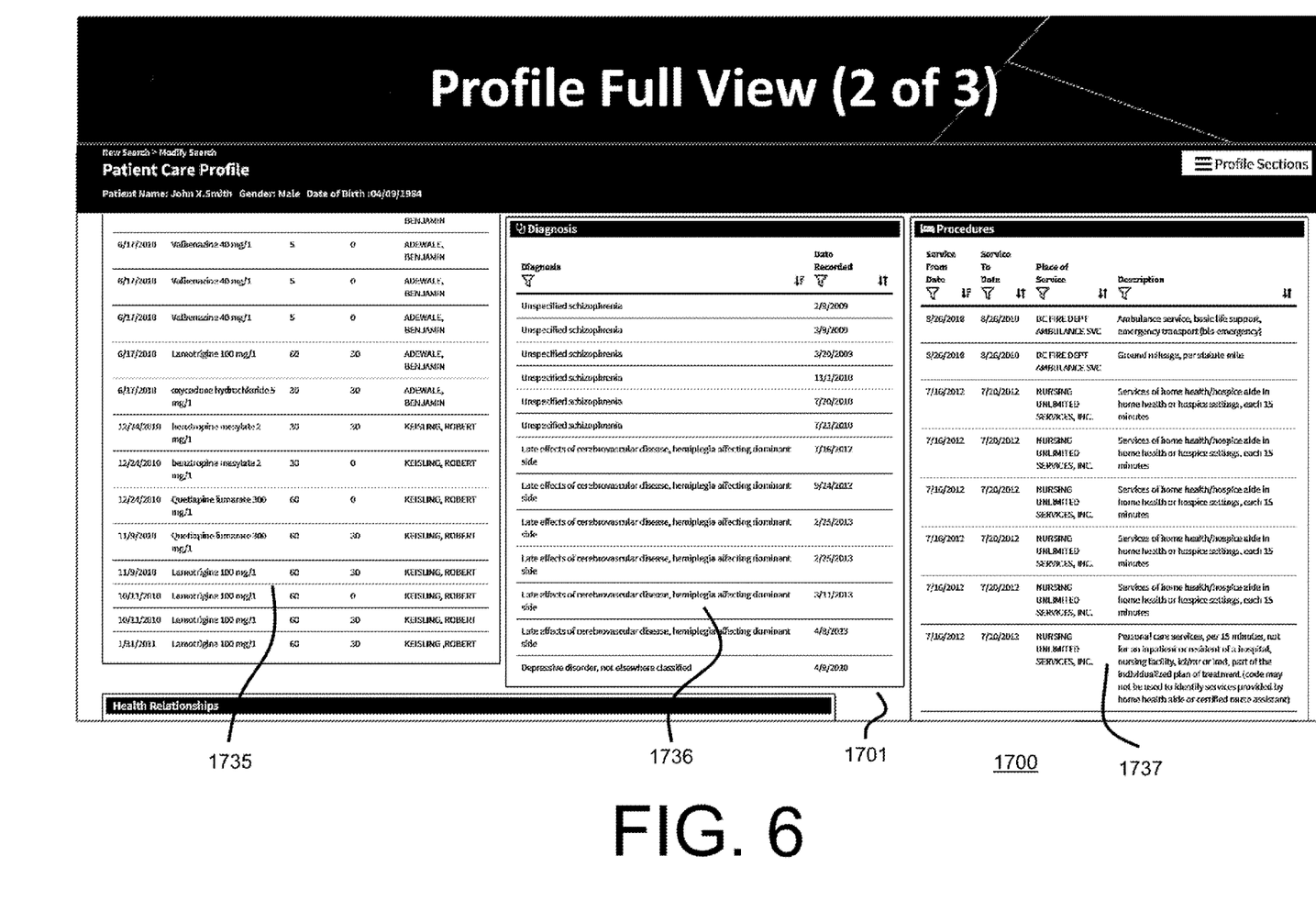
FIG. 6 is an illustration of a second page of the multiple-field screen of the example embodiment GUI.

As shown in FIG. 6, a second page of example embodiment GUI 1700 may include further endpoints 1735, 1736, and 1737 in workspace 1701, displaying further contents from different streams that correlate with a selected option. FIG. 7 illustrates a third page continuing endpoint 1737 along with new endpoints 1738 and 1739 each having potentially unique data stream sources updated in real-time. Different pages of FIGS. 5-7 may be viewed by scrolling or clicking "next page" options in example embodiment GUI 1700.

As seen in FIGS. 3-7, example embodiment GUI 1700 may display several different pieces of data, notification, and query results in a single graphical user interface with several different fields having related contents aggregated from several different data streams. Some endpoints in GUI 1700, such as endpoint field 1733, may be tabular with sortable headings and columns having data drawn from one data stream, and other endpoints, such as chart endpoint 1732, may be dynamic graphical representations of related data from a different source. In this way, example embodiment network architecture 100 may connect to and interface with several distinct data streams from different owners and operators having related data and aggregate the same into a single GUI 1700, with different fields being populated based on stream origin, data type, and operator queries or parameters.

Figure 8:
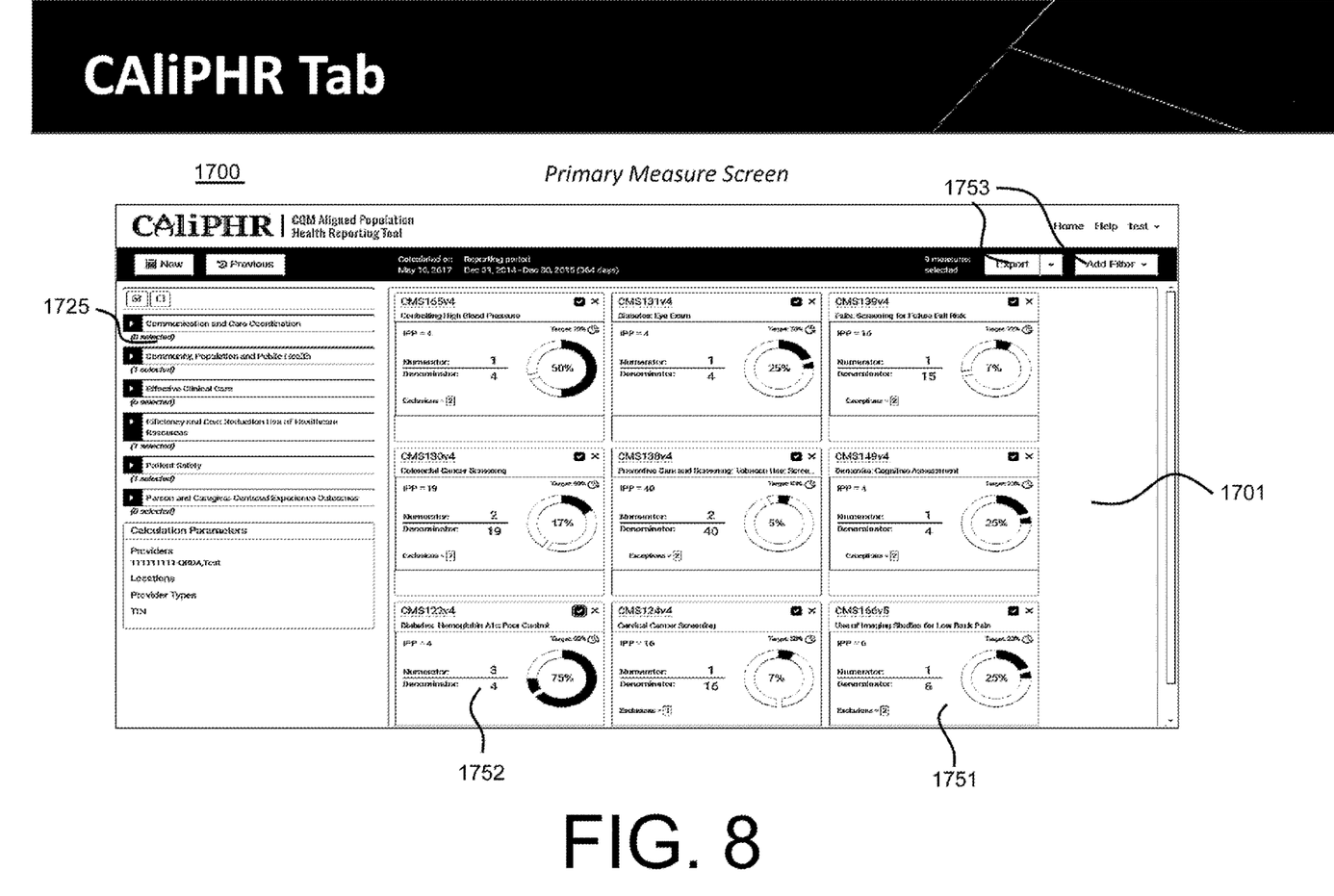
FIG. 8 is an illustration of a selected analytics multiple-pane screen of the example embodiment GUI.

FIG. 8 is an illustration of example embodiment GUI 1700 upon selection of navigation section 1743 for "CAliPHR" from FIG. 3. As seen in FIG. 8, several analytics panes 1751 and 1752 in FIG. 2 are displayed in workspace 1701. In the example of FIG. 8, several different conditions responsive to a time period and provider input through input field 1725 are displayed. Graphical user interface 1700 may display analyzed data created and retrieved by data cluster 110 from multiple data streams in a single workspace 1701. Both graphical elements and raw data may be presented in individual panes. For example, for readmissions or other outcomes as a percentage of a selected facility's total population, one pane 1752 may graphically show values associated with a first condition, while another pane 1751 may graphically show values associated with a second condition. As seen in FIG. 8, one or more display controls 1753 may allow the operator to export underlying data in raw, compressed, or tabulated format as well as add additional filters to display subgroups of panes 1751, 1752, etc.

As seen in FIG. 9, selecting, such as by clicking, on pane 1752 presents an expanded view of additional data associated with the condition, potentially from additional data streams. The user may move through tabs organizing the expanded contents by subject matter as well as interact with tools 1753 to move to next panes, last panes, etc. Similarly, a user may export or save data from expanded view of pane 1752 in example embodiment GUI 1700.

Figure 10:
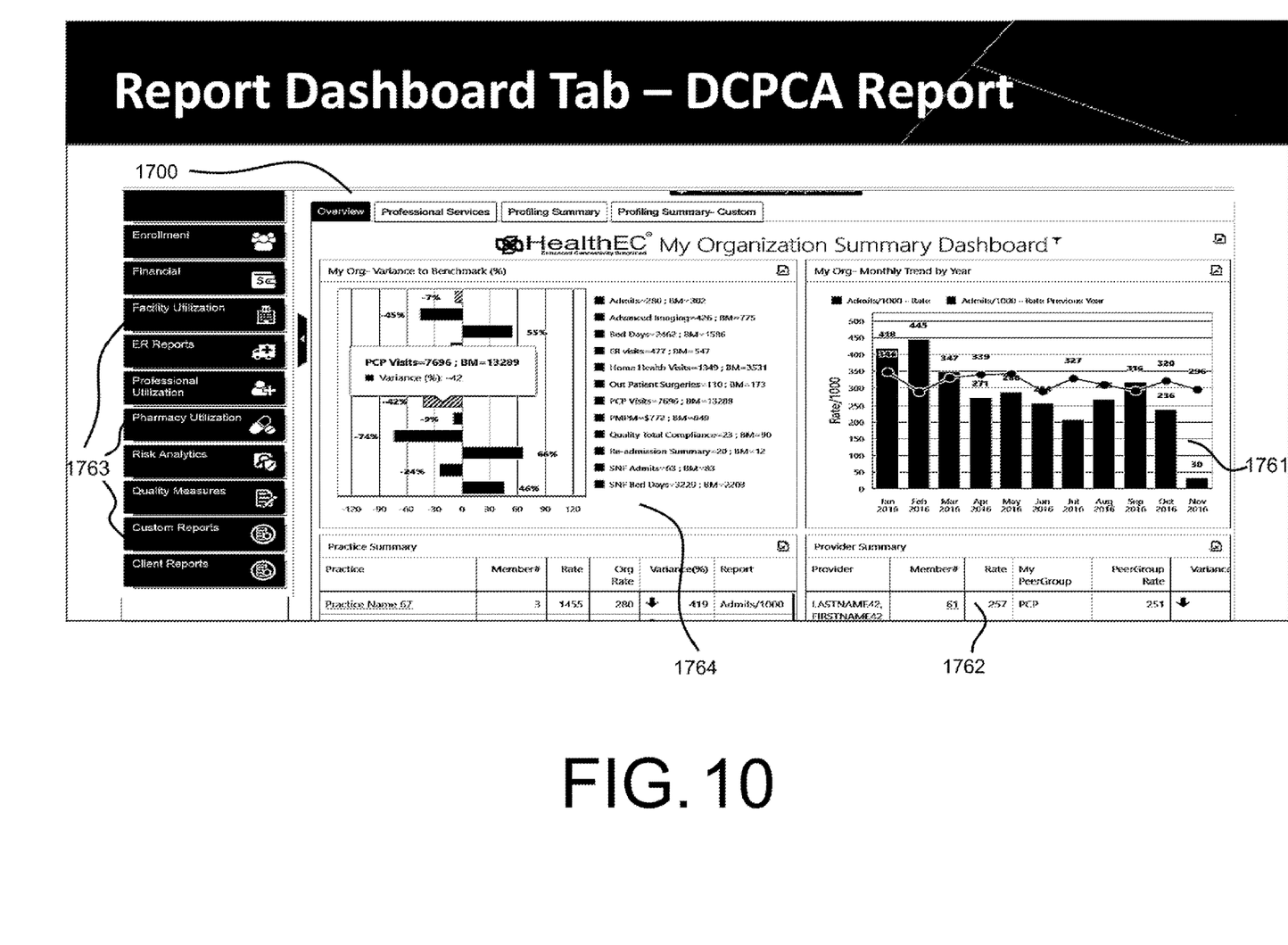
FIG. 10 is an illustration of a third-party output screen of the example embodiment GUI.

As shown in FIG. 3, through navigation selection 1745 for "Report Dashboard" example embodiment GUI 1700 may display third-party reports retrieved from different data streams and display them on the page shown in FIG. 9, which is an example third-party display page in GUI 1700. For example, as shown in FIG. 9, a third-party data stream may offer analysis services with directly output graphical analysis in chart panes 1761 and 1764 as well as tabular data in sortable table pane 1762, responsive to report selections 1763 activated by a user. Cluster 110 may directly access and output the graphical and tabular elements in GUI 1700 of FIG. 10 through an appropriate interface that interacts with the third-party service providing the graphics and tables. In this way, example embodiment architecture 100 (FIG. 2) may provide for a singular GUI 1700 with direct third-party applications and outputs as a workspace 1701.

As seen in FIGS. 3-10, example embodiment network architecture 100 of FIG. 2 may thus gather and discriminate among several different types and number of data streams 35/36 providing dynamic or static data under several different operating standards and protocols, adapt the same for a single-stream output through output engine 114, and display the various pieces of data, analysis thereof, graphical elements, and tabular values in a single GUI 1700 with user-friendly, navigable interfaces on a screen or through an operator input device. Different types of data from different sources may be populated into different on-screen fields based on their origin as determined by data cluster 110. Moreover, analysis, filtering, and other data handling of potentially otherwise separately owned and operated information can be graphically gathered together on GUI 1700 for comprehensive analysis by an operator.

Signals including data for selective endpoint display, in each of the network components, means, modules, mechanisms, units, devices etc. of example network architecture 100 may be 'encrypted' and suitably 'decrypted' when required. Encryption can be accomplished using any encryption technology, such as the process of converting digital information into a new form using a key or a code or a program, wherein the new form is unintelligible or indecipherable to a user or a thief or a hacker or a spammer. The term 'encryption' includes encoding, compressing, or any other translating of the digital content. The encryption of the digital media content can be performed in accordance with any technology including utilizing an encryption algorithm. The encryption algorithm utilized is not hardware dependent and may change depending on the digital content. For example, a different algorithm may be utilized for different websites or programs. The term 'encryption' further includes one or more aspects of authentication, entitlement, data integrity, access control, confidentiality, segmentation, information control, and combinations thereof.

Example embodiment network architecture 100 can be made accessible through a portal or an interface which is a part of, or may be connected to, an internal network or an external network, such as the Internet or any similar portal. The portals or interfaces are accessed by one or more of users through an electronic device, whereby the user may send and receive signals to the portal or interface which gets stored in at least one memory device or at least one data storage device or at least one server. The configuration described herein may be optionally executed from functional data structures on one or more of a non-transitory, computer readable medium, in relation with, and in combination with such pieces of hardware. Such executable configurations may manifest as a website, an executable software program, or a software application. A non-transitory, computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.).

An operator may provide user input through any suitable input device or input mechanism such as but not limited to a keyboard, a mouse, a joystick, a touchpad, a virtual keyboard, a virtual data entry user interface, a virtual dial pad, a software or a program, a scanner, a remote device, a microphone, a webcam, a camera, a fingerprint scanner, a cave, pointing stick, etc. Communicative connections and control among network structures may use Bluetooth, Wi-Fi, Wimax, near-field communications, optical signals, etc.

Actions throughout example embodiment network architectures may include user authentication, data verification, privacy controls, and/or content screening. This will also extend to use an authentication key or access key or electronic device based unique key or any combination thereof. In this way, one or more operators can be blocked or denied access to one or more of the aspects of the invention. For example, operators may never be provided with identifying information of the one another, such that a party creating entries in a data stream and/or a party consuming the same through GUI 1700 may remain anonymous to the other. Data may be encrypted and not retained at one or all points in example methods, such that there may be no discoverable record of signals from data streams 131, independent media, origin and/or limitation information in regard to such content, existence, performance, etc. As to verification, example methods may take advantage of an operator login model requiring user authentication with a password over a secured connection and/or using operating-system-native security control and verification on communications devices, to ensure only verified, permitted operators gain access. Example embodiment network architectures may also require payment verification, such as credit card or bank account authentication, to verify identity and/or ability to pay before allowing access and may use location and input verification available through operating system controls or other network functionalities, potentially in combination with user feedback, to prevent or punish location spoofing, user account compromising, bot access, and/or harassment or waste.

Example methods and embodiments thus being described, it will be appreciated by one skilled in the art that example embodiments may be varied through routine experimentation and without further inventive activity. For example, subscribers are described as providing subscriber parameters to define the parameters of their information delivery service, it is understood that subscriber parameters may be automatically received in example embodiment networks for any subscriber through default options, a controlling ruleset, or through other controlling subscribers as described in US Pat Pub 2014/0278537 to Antony et al., incorporated by reference herein in its entirety. Variations are not to be regarded as departure from the spirit and scope of the exemplary embodiments, and all such modifications as would be obvious to one skilled in the art are intended to be included within the scope of the following claims.

Example methods and embodiments thus being described, it will be appreciated by one skilled in the art that example embodiments may be varied through routine experimentation and without further inventive activity. Variations are not to be regarded as departure from the spirit and scope of the exemplary embodiments, and all such modifications as would be obvious to one skilled in the art are intended to be included within the scope of the following claims.

What is claimed is:

1. A network connected between a plurality of parallel streams and users to condition and route the streams, the network comprising:
    a protocol interface connected to the plurality of streams, wherein the plurality of streams operate on different protocols and include at least one Health Level 7 (HL7) Admit Discharge Transfer message (ADT) stream, wherein the protocol interface is configured for different protocols including HL7;
    an intake interface configured to receive parameters for network operation on the plurality of streams from a plurality of users separate from the plurality of streams; and
    a processor and memory coupled to the intake interface and protocol interface, wherein the memory includes instructions that when executed by the processor, cause the processor to,
        limit flow of the plurality of streams to a receiving user of the plurality users to only an HL7 ADT or a portion of the HL7 ADT, wherein the HL7 ADT or the portion of the HL7 ADT complies with the parameters for network operation for the receiving user, wherein the limiting is executed in real-time with the streams.

2. The network of claim 1, wherein the instructions further cause the processor to,
    format the HL7 ADT or the portion of the HL7 ADT in appearance and/or timing based on the parameters for network operation for the receiving user.

3. The network of claim 1, wherein the instructions further cause the processor to,
    combine information only from the parameters for network operation for the receiving user into the HL7 ADT or the portion of the HL7 ADT.

4. The network of claim 1, wherein the HL7 ADT or the portion of the HL7 ADT complies with the parameters when a patient identity in the parameters matches a patient identity in the HL7 ADT.

5. The network of claim 1, wherein the plurality of streams are controlled and operated by different entities in different locations.

6. The network of claim 1, wherein the instructions further cause the processor to,
dispose of all non-HL7 ADT information from the streams.

7. The network of claim 1, wherein instructions further cause the processor to,
aggregate information from the parameters into HL7 information from the streams when the information from the parameters corresponds to the HL7 information from the streams.

8. The network of claim 1, wherein instructions further cause the processor to,
write information from the parameters to a data source of at least one of the streams for storage in the data source, wherein the information from the parameters includes information not previously stored in the data source.

9. The network of claim 8, wherein the data source is a regional exchange networked and storing data among several providers.

10. The network of claim 1, wherein the instructions further cause the processor to,
dispose of errors and duplicate information in the HL7 ADT or the portion of the HL7 ADT.

11. The network of claim 1, wherein the instructions further cause the processor to,
add additional information not received from the plurality of streams to the flow to the receiving user.

12. A network connected between a plurality of parallel streams and users to enhance the streams, the network comprising:
a protocol interface connected to the plurality of streams, wherein the plurality of streams operate on different protocols and include at least one Health Level 7 (HL7) Admit Discharge Transfer message (ADT) stream, wherein the protocol interface is configured for different protocols including HL7;
an intake interface configured to receive parameters for network operation on the plurality of streams from a plurality of users separate from the plurality of streams; and
a processor and memory coupled to the intake interface and protocol interface, wherein the memory includes instructions that when executed by the processor, cause the processor to,
write patient-identifying information associated with a patient from the parameters to a data source of at least one of the streams for storage in the data source, wherein the information from the parameters includes information not previously stored in the data source.

13. The network of claim 12, wherein the data source is a regional exchange networked and storing data among several providers.

14. The network of claim 12, wherein the instructions further cause the processor to,
limit flow of the plurality of streams to a receiving user of the plurality users to only an HL7 ADT or a portion of the HL7 ADT, wherein the HL7 ADT or the portion of the HL7 ADT complies with the parameters for network operation for the receiving user, wherein the limiting is executed in real-time with the streams.

15. The network of claim 14, wherein the instructions further cause the processor to,
format the HL7 ADT or the portion of the HL7 ADT in appearance and/or timing based on the parameters for network operation for the receiving user.

16. The network of claim 14, wherein the instructions further cause the processor to,
combine information only from the parameters for network operation for the receiving user into the HL7 ADT or the portion of the HL7 ADT.

17. The network of claim 14, wherein the HL7 ADT or the portion of the HL7 ADT complies with the parameters when a patient identity in the parameters matches a patient identity in the HL7 ADT.

18. The network of claim 14, wherein the instructions further cause the processor to,
dispose of all non-HL7 ADT information from the streams.

19. The network of claim 12, wherein the plurality of streams are controlled and operated by different entities in different locations.

20. A network, comprising:
a protocol interface connected to receive a plurality of streams from a plurality of sources including hospitals, wherein the plurality of streams are configured using different communication protocols and include at least one Health Level 7 (HL7) Admit Discharge Transfer message (ADT) stream, wherein the protocol interface is configured to accept different protocols including HL7;
an intake interface configured to receive at least one parameter relating to events and/or information on the plurality of streams from each of a plurality of users separate from the plurality of streams; and
a processor and memory coupled to the intake interface and protocol interface, wherein the memory includes instructions that when executed by the processor, cause the processor to,
limit flow of the plurality of streams in real time to a receiving user of the plurality users to only at least a portion of the HL7 ADT, wherein the at least a portion of the HL7 ADT complies with the at least one parameter for the receiving user.

21. The network of claim 20, wherein the at least one parameter limits the plurality of streams to those streams that only include a particular healthcare patient that has an issue relating to the field of practice of the receiving user.

22. The network of claim 20, wherein the instructions further cause the processor to,
further limit flow of the plurality of streams based on patient-identifying information from a roster maintained in the memory that includes a plurality of client parameters.

* * * * *